(12) United States Patent
Lim et al.

(10) Patent No.: US 9,322,362 B2
(45) Date of Patent: Apr. 26, 2016

(54) SUPERCHARGING SYSTEM FOR ENGINE

(71) Applicant: Hyundai Motor Company, Seoul (KR)

(72) Inventors: Hyun Jun Lim, Incheon (KR); Dong Hee Han, Seoul (KR); Yoon Joo Kim, Yongin-si (KR); Jaeyoung Jeun, Yongin-si (KR); Seung Kook Han, Suwon-si (KR); Jong Il Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 70 days.

(21) Appl. No.: 14/073,655

(22) Filed: Nov. 6, 2013

(65) Prior Publication Data

US 2014/0238016 A1 Aug. 28, 2014

(30) Foreign Application Priority Data

Feb. 28, 2013 (KR) .......................... 10-2013-0022419

(51) Int. Cl.
| | |
|---|---|
| F02B 33/44 | (2006.01) |
| F02B 47/08 | (2006.01) |
| F02M 25/07 | (2006.01) |
| F02B 37/04 | (2006.01) |
| F02B 33/40 | (2006.01) |
| F02B 39/10 | (2006.01) |

(52) U.S. Cl.
CPC ............ *F02M 25/0711* (2013.01); *F02B 33/40* (2013.01); *F02B 37/04* (2013.01); *F02B 39/10* (2013.01); *F02M 25/078* (2013.01); *F02M 25/0726* (2013.01); *Y02T 10/121* (2013.01); *Y02T 10/144* (2013.01)

(58) Field of Classification Search
CPC .......... F02B 33/40; F02B 37/04; F02B 39/10; F02M 25/0711; F02M 25/078; F02M 25/072; Y02T 10/144
USPC ........ 60/611, 606, 602, 607, 605.2, 612, 278, 60/289, 304; 123/568.11
See application file for complete search history.

(56) References Cited

U.S. PATENT DOCUMENTS

| | | | | |
|---|---|---|---|---|
| 6,637,204 | B2 * | 10/2003 | Ellmer et al. ................... | 60/606 |
| 8,627,662 | B2 * | 1/2014 | Freund et al. ................... | 60/606 |
| 2004/0159312 | A1 * | 8/2004 | Hummel ........................ | 123/564 |
| 2006/0064981 | A1 * | 3/2006 | Kojima et al. .................. | 60/612 |
| 2008/0006031 | A1 * | 1/2008 | Schick et al. ................... | 60/606 |

(Continued)

FOREIGN PATENT DOCUMENTS

| | | |
|---|---|---|
| JP | 2009-191686 A | 8/2009 |
| KR | 10-2012-0126209 A | 11/2012 |
| KR | 10-2013-000315 A | 1/2013 |

(Continued)

*Primary Examiner* — Thai Ba Trieu
*Assistant Examiner* — Ngoc T Nguyen
(74) *Attorney, Agent, or Firm* — Morgan, Lewis & Bockius LLP

(57) ABSTRACT

A supercharging system for an engine includes: a cylinder block forming a combustion chamber; an intake manifold connected to the cylinder block to supply ambient air thereto; an exhaust manifold collecting exhaust gas discharged from the combustion chamber and guiding the same to the environment; a third supercharge path connecting an inlet of the intake manifold to the exhaust manifold; and an electric supercharger supplying compressed air to the exhaust manifold through the third supercharge path. Responsiveness of an engine is enhanced and stabilization of the engine is promoted.

12 Claims, 1 Drawing Sheet

(56) References Cited

U.S. PATENT DOCUMENTS

2009/0133385 A1\* 5/2009 Ono .............................. 60/605.2
2010/0116255 A1\* 5/2010 Hatamura ................ 123/568.11

FOREIGN PATENT DOCUMENTS

| KR | 10-2013-0003115 A | 1/2013 |
|----|-------------------|--------|
| WO | WO 2005/085611 A1 | 9/2005 |

\* cited by examiner

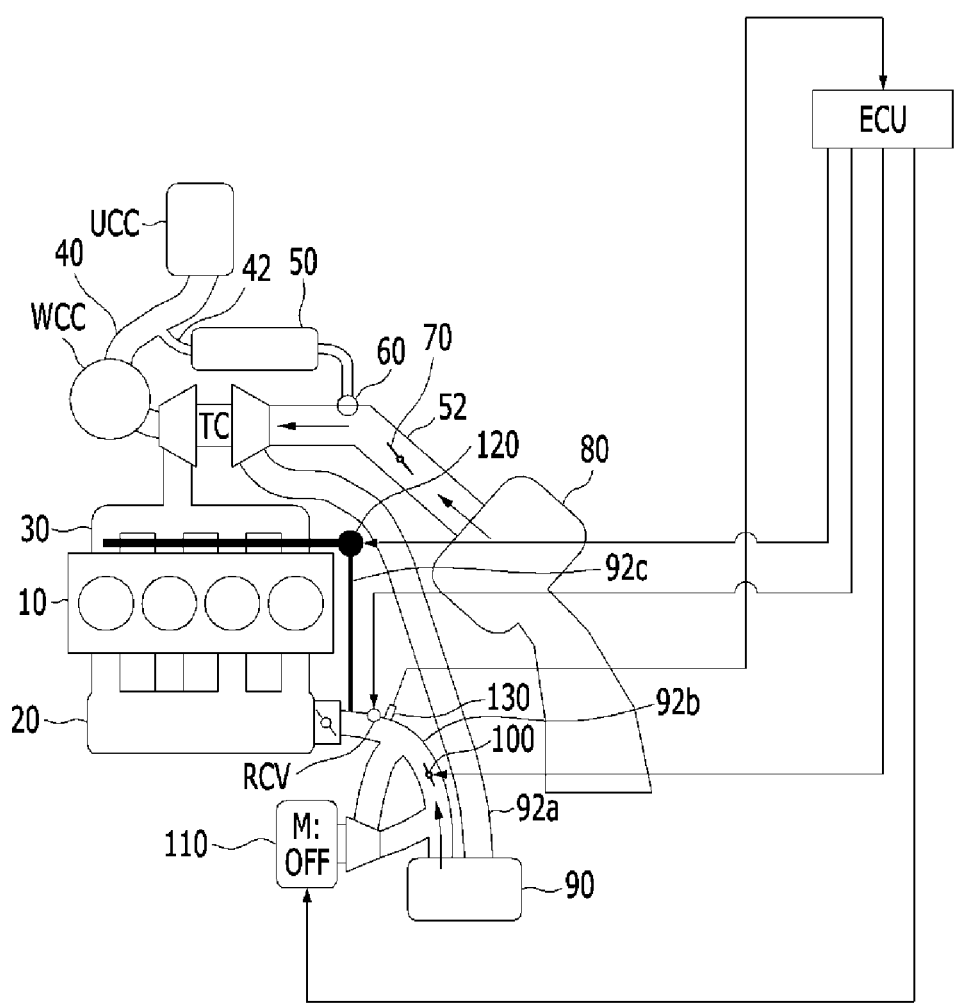

SUPERCHARGING SYSTEM FOR ENGINE

CROSS-REFERENCE TO RELATED APPLICATION

The present application claims priority of Korean Patent Application Number 10-2013-0022419 filed Feb. 28, 2013, the entire contents of which application is incorporated herein for all purposes by this reference.

BACKGROUND OF INVENTION

1. Field of Invention

The present invention relates to a supercharging system for an engine, and more particularly, to a supercharging system for an engine capable of jetting air to an exhaust manifold by using an electric supercharger.

2. Description of Related Art

In a vehicle, generally, ambient air is introduced into the vehicle, mixed with fuel, and supplied to an engine, and the engine burns the mixture of air and fuel to obtain power required for driving the vehicle.

Here, for combustion in the course of generating power by driving an engine, ambient air must be sufficiently supplied to obtain a desired output and combustion efficiency of the engine. Thus, in order to increase combustion efficiency and enhance an output of an engine, a supercharger or a turbo charger that pressurizes air for combustion and supplies the pressurized air is applied to a vehicle.

The supercharger has a structure compressing air to be supplied to an engine by using pressure of an exhaust gas discharged from the engine.

However, there is a limitation in compressing intake air with only pressure of exhaust gas and supplying the same to an engine according to a running situation of a vehicle, so recently, an electric supercharger that drives a compressor by using an electric motor to compress intake air and supplies the same is applied to a vehicle.

The electric supercharger serves to secondarily jet air toward an exhaust manifold in order to enhance responsiveness of an engine in a turbo-lag interval before the turbo charger operates.

In a system of secondarily jetting air toward an exhaust manifold by using an electric supercharger as mentioned above, there is a need to shorten a length of an air jetting flow channel to enhance responsiveness of an engine, and discharge supercharged air outwardly to stabilize the engine after air is secondarily jet.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a supercharging system for an engine having advantages of enhancing responsiveness of an engine by effectively jetting compressed air toward an exhaust manifold through a short flow channel by using an electric supercharger, and stabilizing the engine by discharging supercharged air outwardly after compressed air is jet toward the exhaust manifold.

Various aspects of the present invention provide for a supercharging system for an engine, including: a cylinder block forming a combustion chamber; an intake manifold connected to the cylinder block to supply ambient air thereto; an exhaust manifold collecting exhaust gas discharged from the combustion chamber and guiding the same to the outside; a third supercharge path connecting an inlet of the intake manifold to the exhaust manifold; and an electric supercharger supplying compressed air to the exhaust manifold through the third supercharge path.

The supercharging system may further include an air control valve installed in the third supercharge path in order to control supply of compressed air supplied to the exhaust manifold through the third supercharge path.

The supercharging system may further include: a turbo charger compressing ambient air by using pressure of exhaust gas discharged from the combustion chamber and supplying compressed air to the combustion chamber; an intercooler cooling compressed air supplied from the turbo charger to the combustion chamber; a first supercharge path connecting the turbo charger and the intercooler; and a second supercharge path connecting the intercooler and the intake manifold, wherein the electric supercharger is connected to the second supercharge path.

The supercharging system may further include: a bypass valve opening and closing the second supercharge path, wherein an inlet of the electric supercharger may be connected to the second supercharge path between the bypass valve and the intercooler and an outlet of the electric supercharger may be connected to the second supercharge path between the bypass valve and the intake manifold.

The supercharging system may further include: a recirculation valve discharging compressed air within the third supercharge path to the outside.

An intake path allowing ambient air to flow therein may be connected to the turbo charger, an air cleaner filtering foreign materials included in the ambient air may be installed in the intake path, an opening and closing valve opening and closing the intake path may be installed, a recirculation path allowing a partial amount of exhaust gas discharged through the exhaust manifold, to be introduced to the intake path may be connected to the intake path, an EGR cooler cooling exhaust gas may be installed in the recirculation path, and a control valve controlling exhaust gas introduced to the intake path through the recirculation path may be provided.

The control valve and the opening and closing valve may constitute an integrated valve unit.

A pressure sensor sensing pressure of the third supercharge path may be provided, and an engine control unit controlling the recirculation valve and the bypass valve by detecting pressure of the third supercharge path may be provided.

When pressure of the third supercharge path sensed by the pressure sensor is higher than a pre-set pressure, the engine control unit may control the recirculation valve to be opened to discharge compressed air within the third supercharge path to the outside.

The engine control unit may sequentially perform controlling the electric supercharger to be operated; controlling the air control valve to be opened and the bypass valve to be closed; controlling the air control valve to be closed and the bypass valve to be opened after a predetermined time elapses; controlling the electric supercharger to be turned off; sensing pressure of the third supercharge path by the medium of the pressure sensor; and controlling opening and closing of the recirculation valve according to pressure sensed by the pressure sensor.

In the case of the supercharging system for an engine according to various aspects of the present invention, since the electric supercharger is disposed between the intercooler and the intake manifold, a length of an injection flow path of compressed air jetted to the exhaust manifold through the electric supercharger is shortened, enhancing responsiveness of an engine.

Also, after compressed air is jetted through the electric supercharger, compressed air boosted by the electric supercharger is effectively discharged to the outside through the recirculation valve. Thus, the engine is stabilized, and when the electric supercharger is abnormally operated, stabilization can be secured.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a view illustrating a configuration of an exemplary supercharging system for an engine according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, an intake manifold 20 allowing air or a mixture of air and fuel to be introduced therein is connected to a cylinder block 10 forming a combustion chamber of an engine, and an exhaust manifold 30 for discharging exhaust gas generated after combustion in the combustion chamber from the cylinder block 10 is connected to the cylinder block 10.

A turbo charger TC is connected to the exhaust manifold 30 and the intake manifold charger 20, respectively, in order to compress air by using pressure of exhaust gas discharged through the exhaust manifold 30 and supply the compressed air to the intake manifold 20.

Namely, a turbine constituting the turbo charger TC is connected to the exhaust manifold 30 and an impeller constituting the turbo charger TC is connected to the intake manifold 20.

Also, an exhaust path 40 is connected to the exhaust manifold 30 in order to induce exhaust gas introduced to the exhaust manifold 30 to the outside, that is, the environment.

A catalytic converter is installed in the exhaust path 40 in order to reduce harmful components included in exhaust gas discharged through the exhaust path 40. The catalytic converter may include a warm-up catalytic converter (WCC) and an under floor catalytic converter (UCC).

A recirculation path 42 is connected to the exhaust path 40 between the two catalytic converters WCC and UCC in order to recirculate a portion of exhaust gas to the cylinder block 10, and an exhaust gas recirculation cooler 50 is installed in the recirculation path 42 in order to reduce temperature of exhaust gas.

An intake path 52 allowing ambient air to flow thereto is connected to the turbo charger TC, and the recirculation path 42 is connected to the intake path 52, so the turbo charger TC compresses a portion of exhaust gas and ambient gas and supplies the same to the cylinder block 10.

In order to control exhaust gas introduced to the intake path 52 through the recirculation path 42, a control valve 60 is installed in the recirculation path 42.

An opening and closing valve 70 for controlling opening and closing of the intake path 52 is installed in the intake path 52, and the control valve 60 and the opening and closing valve 70 may be configured as an integrated valve unit.

An air cleaner 80 filtering foreign materials included in ambient air and a bypass valve 100 are installed in the intake path 52.

An outlet of the turbo charger TC is connected to the intake manifold 20 through a supercharge path.

An intercooler 90 is installed midway in the supercharge path in order to cool supercharged air discharged after being compressed by the turbo charger TC and supply the same to the intake manifold 20.

Namely, an outlet of the turbo charger TC and an inlet of the intercooler 90 are connected through a first supercharge path 92a, and an outlet of the intercooler 90 and the intake manifold 20 are connected through a second supercharge path 92b.

In order to compress air and supply compressed air to the intake manifold 20 or the exhaust manifold 30, an electric supercharger 110 is installed in a second supercharge path 92 between the intercooler 90 and the intake manifold 20.

An inlet of the electric supercharger 110 is connected to the second supercharge path 92b between the intercooler 90 and a bypass valve 100, and an outlet of the electric supercharger 110 is connected to the second supercharge path 92b between the bypass valve 100 and the intake manifold 20.

Also, a recirculation valve (RCV) for discharging compressed air boosted by the electric supercharger to the outside is installed in the second supercharge path 92b between the bypass valve 100 and the intake manifold 20.

The recirculation valve (RCV) also serves to prevent surge of a compressor of the turbo charger (TC) generated when an engine load is rapidly lowered after air is compressed and supercharged to the turbo charger (TC).

In order to enhance responsiveness of the engine during a turbo-lag interval before the turbo charger (TC) operates, a third supercharge path 92c is provided to supply air compressed by the electric supercharger 110 to the exhaust manifold 30.

The third supercharge path 92c connects the second supercharge path 92b between the recirculation valve (RCV) and the intake manifold 20 to the exhaust manifold 30 to supply compressed air in the second supercharge path 92b to the exhaust manifold 30.

In order to control supply of compressed air through the third supercharge path 92c, an air control valve 120 is installed in the third supercharge path 92c.

Also, in order to sense air pressure within the second supercharge path 92b, a pressure sensor 130 is installed in the second supercharge path 92b between the bypass valve 100 and the intake manifold 20.

The pressure sensor 1330 is connected to an input terminal of an engine control unit (ECU) so that a pressure signal sensed by the pressure sensor 130 is input to an electronic control unit or the engine control unit (ECU).

The electric supercharger 110, the recirculation valve RCV, the bypass valve 100, and the air control valve 120 are connected to an output terminal of the ECU, and operations thereof are controlled according to a control signal from the ECU.

While a vehicle is running, the engine control unit (ECU) applies a driving signal to the electric super charger 110 during a turbo-leg interval before the turbo charger (TC) operates.

When the electric supercharger 110 is driven, the recirculation valve (RCV) is maintained in an OFF state (in this state, the second supercharge path 92b is shut against the outside), and the bypass valve 100 is maintained in an OFF state in order to shut the second supercharge path 92b between the intercooler 90 and the intake manifold 20.

The electric supercharger 110, driven upon receiving a driving signal from the engine control unit (ECU), allows ambient air to flow therein through the second supercharge path 92b between the intercooler 90 and the bypass valve 100, compresses the same, and subsequently supplies compressed air to the second supercharge path 92b between the bypass valve 100 and the intake manifold 20.

When compressed air is supplied by the electric supercharger 110, the engine control unit (ECU) applies a control signal to the air control valve 120 to open the third supercharge path 92c.

Accordingly, the compressed air, passing through the third supercharge path 92c and the air control valve 120, is jet to the exhaust manifold 30, and the compressed air jetted to the exhaust manifold 30 acts as an operating pressure on the turbo charger (TC), increases pressure of intake air, and supplies the same to the engine.

In this manner, since compressed air is supplied to the exhaust manifold 30 through the short third supercharge path 92c, responsiveness of the engine is enhanced.

Meanwhile, after the electric supercharger 110 is operated to jet air to the exhaust manifold 30 to stabilize an operation of the engine, namely, after a predetermined time has elapsed, the engine control unit (ECU) applies a control signal to the air control valve 120 to shut the third supercharge path 92c to prevent exhaust gas from flowing backward through the exhaust manifold 30, a control signal to the bypass valve 100 to open the second supercharge path 92b, and the operation of the electric supercharger 110 is stopped by interrupting a driving signal of the electric supercharge 110.

Subsequently, the engine control unit (ECU) senses internal pressure of the second supercharge path 92b by the medium of the pressure sensor 130, and when the sensed pressure is determined to be higher than a pre-set pressure, the engine control unit (ECU) applies a control signal to the recirculation valve (RCV) to open it, whereby compressed air within the second supercharge path 92b is discharged to the outside through the recirculation valve (RCV), releasing pressure in the second supercharge path 92b.

Of course, when pressure within the second supercharge path 92b is lower than the pre-set pressure, the recirculation valve (RCV) is maintained in an OFF state.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A supercharging system for an engine, comprising:
   a cylinder block including a combustion chamber;
   an intake manifold connected to the cylinder block to supply ambient air thereto;
   an exhaust manifold collecting exhaust gas discharged from the combustion chamber and guiding the exhaust gas to an environment;
   a first supercharge path connecting an inlet of the intake manifold to the exhaust manifold;
   an electric supercharger supplying compressed air to the exhaust manifold through the first supercharge path; and
   a recirculation valve mounted to a second supercharge path and discharging a portion of compressed air within the second supercharge path to the environment, wherein an end of the second supercharge path is connected to the intake manifold,
   wherein:
      a pressure sensor sensing pressure of the second supercharge path is provided; and
      an engine control unit controlling the recirculation valve and the bypass valve by detecting pressure of the second supercharge path is provided.

2. The supercharging system of claim 1, wherein when the pressure of the second supercharge path sensed by the pressure sensor is higher than a pre-set pressure, the engine control unit controls the recirculation valve to be opened to discharge the compressed air within the second supercharge path to the environment.

3. The supercharging system of claim 2, wherein the engine control unit sequentially performs:
   controlling the electric supercharger to be operated to compress air flowing therein and controlling the air control valve to be opened and the bypass valve to be closed when the compressed air is supplied by the electric supercharger;
   controlling the air control valve to be closed and the bypass valve to be opened after a predetermined time elapses after the compressed air is supplied and controlling the electric supercharger to be turned off when the bypass valve is opened;
   sensing pressure of the second supercharge path by the pressure sensor after the electric supercharger is turned off; and
   controlling opening and closing of the recirculation valve according to the pressure sensed by the pressure sensor when the sense pressure is higher than a pre-set pressure.

4. A supercharging system for an engine, comprising:
   a cylinder block including a combustion chamber;
   an intake manifold connected to the cylinder block to supply ambient air thereto;
   an exhaust manifold collecting exhaust gas discharged from the combustion chamber and guiding the exhaust gas to an environment;
   a first supercharge path connecting an inlet of the intake manifold to the exhaust manifold;
   an electric supercharger supplying compressed air to the exhaust manifold through the first supercharge path; and
   a recirculation valve mounted to a second supercharge path and discharging a portion of compressed air within the second supercharge path to the environment, wherein an end of the second supercharge path is connected to the intake manifold, a turbo charger compressing ambient air by using pressure of exhaust gas discharged from the combustion chamber and supplying compressed air to the combustion chamber;

an intercooler cooling the compressed air supplied from the turbo charger to the combustion chamber;

a third supercharge path connecting the turbo charger and the intercooler;

the second supercharge path connecting the intercooler and the intake manifold;

wherein the electric supercharger is connected to the second supercharge path, and wherein:
  an intake path allowing ambient air to flow therein is connected to the turbo charger;
  an air cleaner filtering foreign materials included in the ambient air is installed in the intake path;
  an opening and closing valve opening and closing the intake path is installed;
  a recirculation path allowing a partial amount of exhaust gas discharged through the exhaust manifold to be introduced to the intake path, is connected to the intake path;
  an Exhaust Gas Recirculation (EGR) cooler cooling exhaust gas is installed in the recirculation path; and
  a control valve controlling exhaust gas introduced to the intake path through the recirculation path is provided.

5. The supercharging system of claim 4, wherein the control valve and the opening and closing valve constitute an integrated valve unit.

6. A supercharging system for an engine, comprising:
a cylinder block including a combustion chamber;
an intake manifold connected to the cylinder block to supply ambient air thereto;
an exhaust manifold collecting exhaust gas discharged from the combustion chamber and guiding the exhaust gas to an environment;
a first supercharge path connecting an inlet of the intake manifold to the exhaust manifold;
an electric supercharger supplying compressed air to the exhaust manifold through the first supercharge path;
a recirculation valve mounted to a second supercharge path and discharging a portion of compressed air within the second supercharge path to the environment, wherein an end of the second supercharge path is connected to the intake manifold;
a turbo charger compressing ambient air by using pressure of exhaust gas discharged from the combustion chamber and supplying compressed air to the combustion chamber;
an intercooler cooling the compressed air supplied from the turbo charger to the combustion chamber;
a third supercharge path connecting the turbo charger and the intercooler;
the second supercharge path connecting the intercooler and the intake manifold;
wherein the electric supercharger is connected to the second supercharge path;
a bypass valve opening and closing the second supercharge path;

wherein:
  an inlet of the electric supercharger is connected to the second supercharge path between the bypass valve and the intercooler; and
  an outlet of the electric supercharger is connected to the second supercharge path between the bypass valve and the intake manifold.

7. The supercharging system of claim 6, further comprising:
an air control valve installed in the first supercharge path in order to control supply of compressed air supplied to the exhaust manifold through the first supercharge path.

8. The supercharging system of claim 6, wherein
an intake path allowing ambient air to flow therein is connected to the turbo charger;
an air cleaner filtering foreign materials included in the ambient air is installed in the intake path;
an opening and closing valve opening and closing the intake path is installed;
a recirculation path allowing a partial amount of exhaust gas discharged through the exhaust manifold to be introduced to the intake path, is connected to the intake path;
an Exhaust Gas Recirculation (EGR) cooler cooling exhaust gas is installed in the recirculation path; and
a control valve controlling exhaust gas introduced to the intake path through the recirculation path is provided.

9. The supercharging system of claim 8, wherein the control valve and the opening and closing valve constitute an integrated valve unit.

10. The supercharging system of claim 6, wherein
a pressure sensor sensing pressure of the second supercharge path is provided; and
an engine control unit controlling the recirculation valve and the bypass valve by detecting pressure of the second supercharge path is provided.

11. The supercharging system of claim 10, wherein when the pressure of the second supercharge path sensed by the pressure sensor is higher than a pre-set pressure, the engine control unit controls the recirculation valve to be opened to discharge the compressed air within the second supercharge path to the environment.

12. The supercharging system of claim 11, wherein the engine control unit sequentially performs:
controlling the electric supercharger to be operated to compress air flowing therein and controlling the air control valve to be opened and the bypass valve to be closed when the compressed air is supplied by the electric supercharger;
controlling the air control valve to be closed and the bypass valve to be opened after a predetermined time elapses after the compressed air is supplied and controlling the electric supercharger to be turned off when the bypass valve is opened;
sensing pressure of the second supercharge path by the pressure sensor after the electric supercharger is turned off; and
controlling opening and closing of the recirculation valve according to the pressure sensed by the pressure sensor when the sense pressure is higher than a pre-set pressure.

* * * * *